(12) United States Patent
Kunert et al.

(10) Patent No.: US 8,061,726 B2
(45) Date of Patent: Nov. 22, 2011

(54) WHEEL SUSPENSION FOR A FRONT AXLE OF A MOTOR VEHICLE

(75) Inventors: Reinhard Kunert, Weissach (DE);
Wilhelm Frasch, Oberboihingen (DE);
Norbert Schote, Ammerbuch (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 106 days.

(21) Appl. No.: 12/341,464

(22) Filed: Dec. 22, 2008

(65) Prior Publication Data

US 2009/0160153 A1 Jun. 25, 2009

(30) Foreign Application Priority Data

Dec. 21, 2007 (DE) .................. 10 2007 063 544

(51) Int. Cl.
*B60G 3/26* (2006.01)

(52) U.S. Cl. ..... 280/124.15; 280/124.144; 280/124.106; 280/124.145

(58) Field of Classification Search ........... 280/124.135, 280/124.136, 124.137, 124.138, 124.139, 280/124.14, 124.141, 124.142, 124.143, 280/124.144, 124.106, 124.145, 124.15
See application file for complete search history.

(56) References Cited

U.S. PATENT DOCUMENTS

| | | | | |
|---|---|---|---|---|
| 5,048,858 A | * | 9/1991 | Luger | 280/124.136 |
| 5,382,044 A | * | 1/1995 | Smith et al. | 280/124.109 |
| 5,499,839 A | * | 3/1996 | Wahl et al. | 280/124.145 |
| 5,782,484 A | * | 7/1998 | Kuhn, Jr. | 280/124.142 |
| 6,161,853 A | * | 12/2000 | Jung | 280/124.136 |
| 6,719,314 B1 | | 4/2004 | Schote | |
| 6,874,816 B2 | * | 4/2005 | Herrmann et al. | 280/781 |
| 7,083,176 B2 | * | 8/2006 | Soles et al. | 280/86.755 |

FOREIGN PATENT DOCUMENTS

| | | |
|---|---|---|
| DE | 90 07 780 U1 | 10/1995 |
| DE | 9422146 U1 | 4/1998 |
| DE | 10061407 A1 | 6/2002 |
| EP | 0239449 A1 | 9/1987 |
| EP | 1932691 A1 | 6/2008 |
| JP | 06064420 A * | 3/1994 |
| WO | 0066377 A2 | 11/2000 |

* cited by examiner

*Primary Examiner* — Paul N Dickson
*Assistant Examiner* — Keith Frisby

(57) ABSTRACT

As a result of a configuration and position of an upper transverse link and of a lower transverse link, a wheel pivot axis is created which has a point of intersection with an area region of a vertical wheel central transverse plane and a wheel central longitudinal plane. An adjustment of the wheel in a toe-out sense takes place under the influence of braking forces and an adjustment of the wheel in a toe-in sense takes place under the influence of drive forces. Furthermore, as a result of different mount characteristics at the lower transverse link and at the track rod, it is ensured that, in the event of side forces, the wheel which is at the outside of the corner is adjusted in a toe-out sense.

8 Claims, 5 Drawing Sheets

WHEEL SUSPENSION FOR A FRONT AXLE OF A MOTOR VEHICLE

CROSS REFERENCE TO RELATED APPLICATION

This application claims the priority, under 35 U.S.C. §119, of German application DE 10 2007 063 544.5, filed Dec. 21, 2007; the prior application is herewith incorporated by reference in its entirety.

BACKGROUND OF THE INVENTION

Field of the Invention

The invention relates to a wheel suspension for a front axle of a motor vehicle.

German utility model DE 90 07 780 U1 describes a double transverse link axle with a spring/damper strut, which double transverse link axle holds, at the upper free end of a wheel carrier, a transverse link with two transversely projecting arms in a mount, which arms are articulatedly connected to the body. A lower transverse link is held in a mount on the wheel carrier and is articulatedly connected in two mounts.

SUMMARY OF THE INVENTION

It is accordingly an object of the invention to provide a wheel suspension for a front axle of a motor vehicle that overcomes the above-mentioned disadvantages of the prior art devices of this general type, by which a tuned steering geometry and arrangement of the front wheel suspension and resulting rotational axes, pivot axes and rotational poles are formed, in order to obtain an optimum driving behavior in all possible driving states under the forces which act on the wheel.

With the foregoing and other objects in view there is provided, in accordance with the invention, a wheel suspension for a front axle of a motor vehicle having a wheel and a body. The wheel suspension contains a wheel carrier, mounts including body-side mounts and wheel-carrier-side mounts, and a first upper transverse link having an upper free end mounted on the wheel carrier. The first upper transverse link has two transversely projecting arms articulatedly connected to the body via the mounts. A second lower transverse link is disposed below a horizontal wheel central plane. The second lower transverse link is articulatedly connected at a first side to the wheel carrier in one of the mounts and at a second side to the body in two of the mounts. The second lower transverse link holds a lower end of a damper strut in a supporting fashion. The first upper transverse link and the second lower transverse link have rotational axes and in each case one rotational axis. The rotational axes are defined by the body-side mounts and are offset with respect to one another in height, with the rotational axis of the first upper transverse link being disposed closer to the wheel than the rotational axis of the second lower transverse link. In each case one of the body-side mounts for the first upper transverse link is disposed at each side of a vertical wheel central transverse plane. Two of the body-side mounts for the second lower transverse link are disposed—in relation to a direction of travel—in front of the vertical wheel central transverse plane, and in that a wheel pivot axis is formed by wheel-carrier-side mounts for the first and second transverse links.

The main advantages obtained by the invention are that, as a result of the arrangement of the two transverse links with respect to one another and by the track rod and by the damper strut and the corresponding mount characteristics, a perfected wheel suspension is obtained in order to improve driving behavior and comfort. This is obtained in particular in that the two transverse links have in each case one rotational axis, which rotational axes are formed by body-side mounts and are offset with respect to one another in height. The rotational axis of the first, upper transverse link is arranged closer to the wheel than the rotational axis of the second, lower transverse link. In each case one body-side mount of the first, upper transverse link is arranged at each side of a vertical wheel central transverse plane, and in that the two body-side mounts of the second, lower transverse link are arranged—in relation to the direction of travel—in front of the vertical wheel central transverse plane. A wheel pivot axis is formed by wheel-carrier-side mounts of the transverse links. It is provided in particular according to the invention that the rotational axis of the first, upper transverse link runs parallel to the vertical wheel central longitudinal plane, and in that the rotational axis of the second, lower transverse link is arranged at an acute angle with respect to the rotational axis of the upper transverse link, with the rear body-side mount of the lower transverse link being arranged in front of the vertical wheel central transverse plane and closer to the latter than the front body-side mount of the upper transverse link.

In order that an optimal wheel pivot axis which favorably influences the driving behavior can be obtained, it is the case inter alia that the wheel-carrier-side mount of the upper transverse link is arranged—in relation to the direction of travel—behind the vertical wheel central transverse plane, with the wheel-carrier-side mount of the lower transverse link being situated—in relation to the direction of travel—in front of the vertical wheel central transverse plane. It is in particular provided according to the invention that the wheel-carrier-side mount of the lower transverse link is situated on an identical vertical, obliquely-running plane to the mounts of the upper transverse link. As a result of the position or arrangement of the transverse links with respect to one another and of the mounts at the body and wheel carrier sides, a wheel pivot axis for the front wheels is defined, which wheel pivot axis is formed by the wheel-carrier-side mounts of the two transverse links and runs, through a wheel axis, obliquely outward toward the wheel and forward in relation to the direction of travel, and has a point of intersection with the wheel contact plane in an area region of the wheel central longitudinal plane and—in relation to the direction of travel—in front of the vertical wheel central transverse plane.

In order that, during cornering and in the event of occurring side forces, the outer wheel can be adjusted in the direction of toe-out under the action of loads on the wheel, it is provided according to the invention that the rear mount of the lower transverse link has a harder mount characteristic than the mount of a steering track rod of the steering cylinder unit with the relatively soft mount characteristic. The steering track rod is arranged—in relation to the direction of travel—behind the vertical wheel central transverse plane and a stabilizer is provided spaced apart from the steering track rod, which stabilizer is mounted by a hanger on the damper strut.

The influencing of the wheel position under braking forces, side forces and under drive forces can be controlled by the arrangement of the wheel suspension or the arrangement of the mounts in that the one free end of the steering track rod is held on the wheel carrier in a mount and a first imaginary ray runs through the mount and through the connection to the steering cylinder unit, which ray, with a second imaginary ray through the wheel-carrier-side mount and through the rear body-side mount of the lower transverse link in the plan view, forms an instantaneous rotational pole within the vertical wheel central longitudinal plane, and the wheel can be adjusted in a toe-out sense under the influence of braking forces and can be adjusted in a toe-in sense under the influence of drive forces.

Other features which are considered as characteristic for the invention are set forth in the appended claims.

Although the invention is illustrated and described herein as embodied in a wheel suspension for a front axle of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
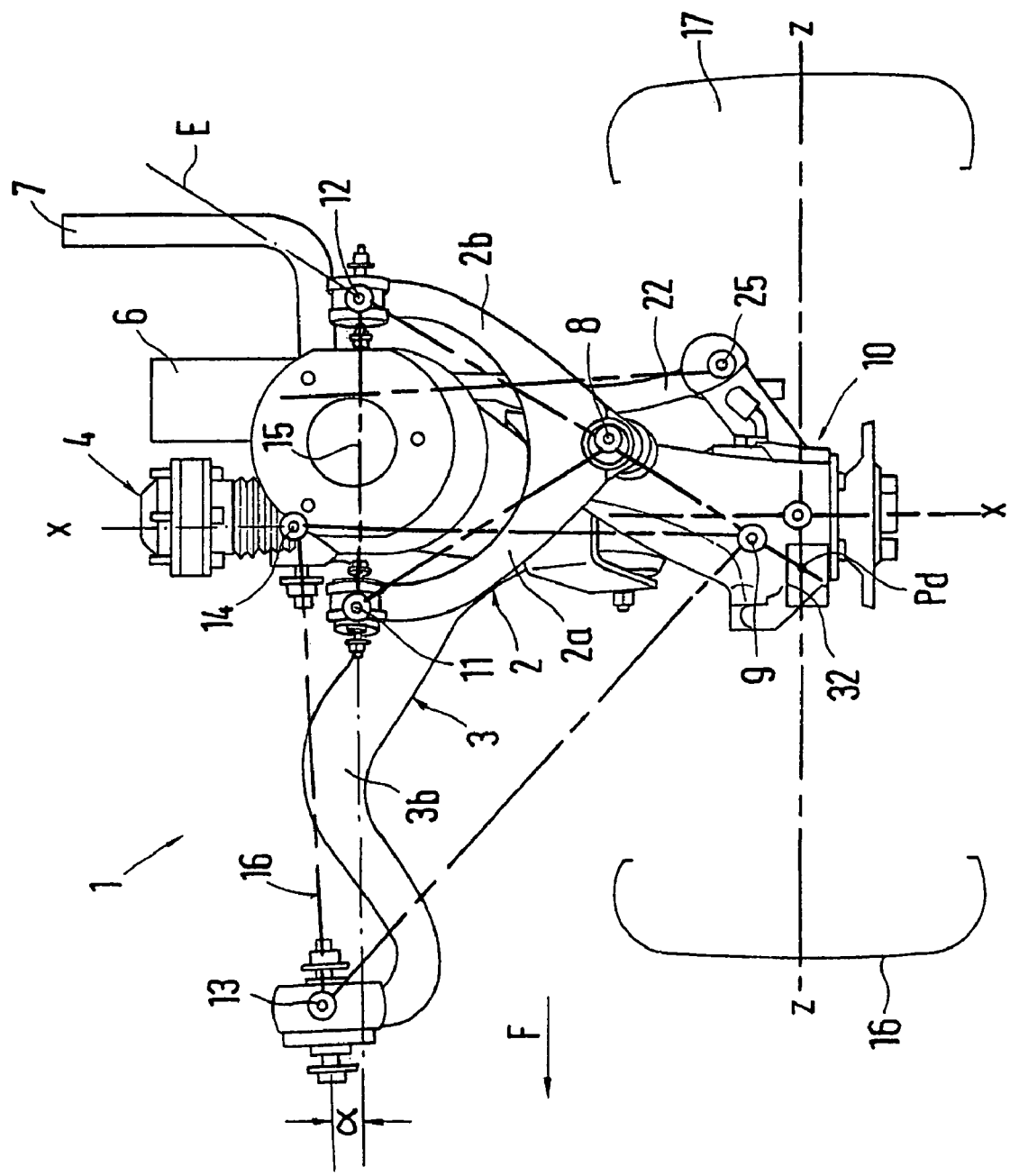
FIG. 1 is a diagrammatic, plan view of a wheel suspension having two transverse links which are arranged one above the other, a steering device with a track rod, and a damper strut according to the invention.
Figure 1A:
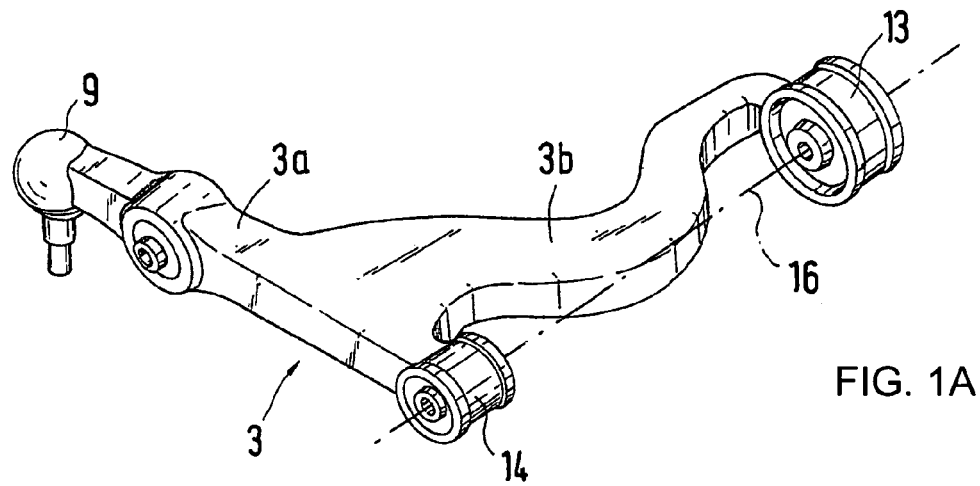
FIG. 1A is a diagrammatic, perspective view of a lower transverse link of the wheel suspension.
Figure 2:
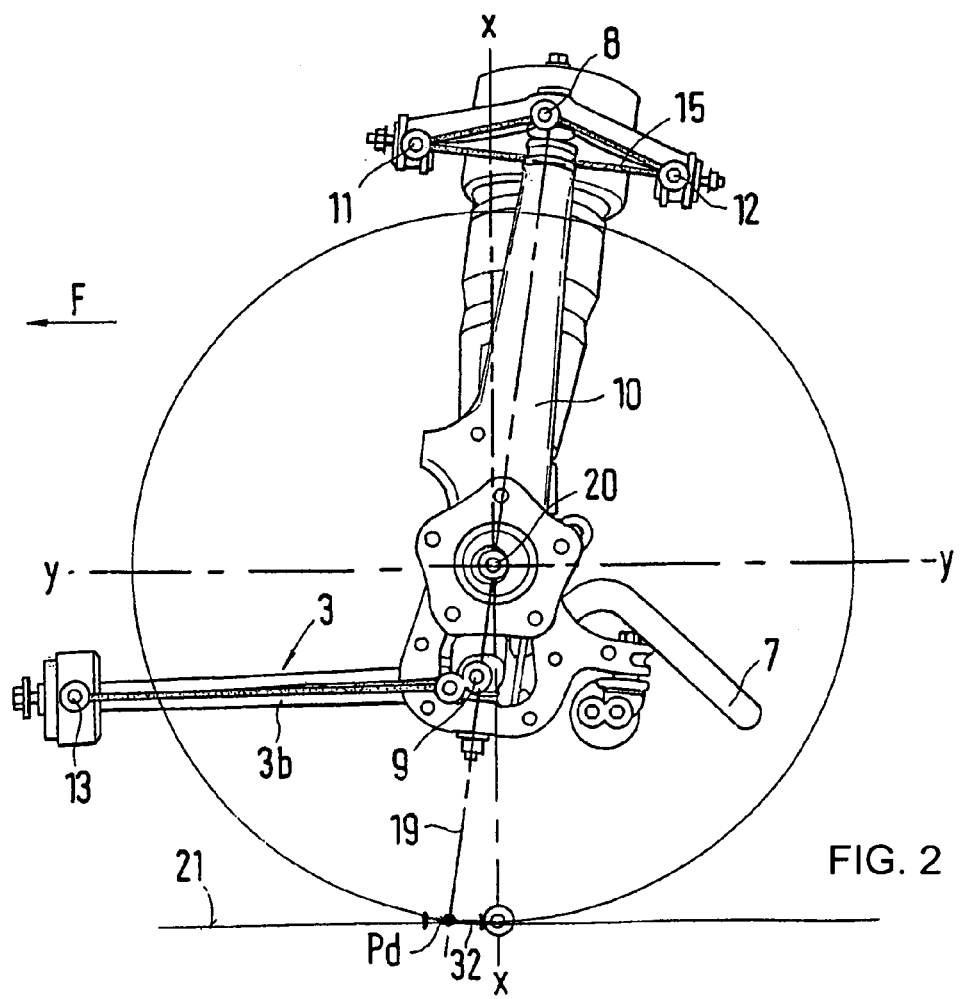
FIG. 2 is a diagrammatic, side view of the wheel suspension according to FIG. 1.
Figure 4:
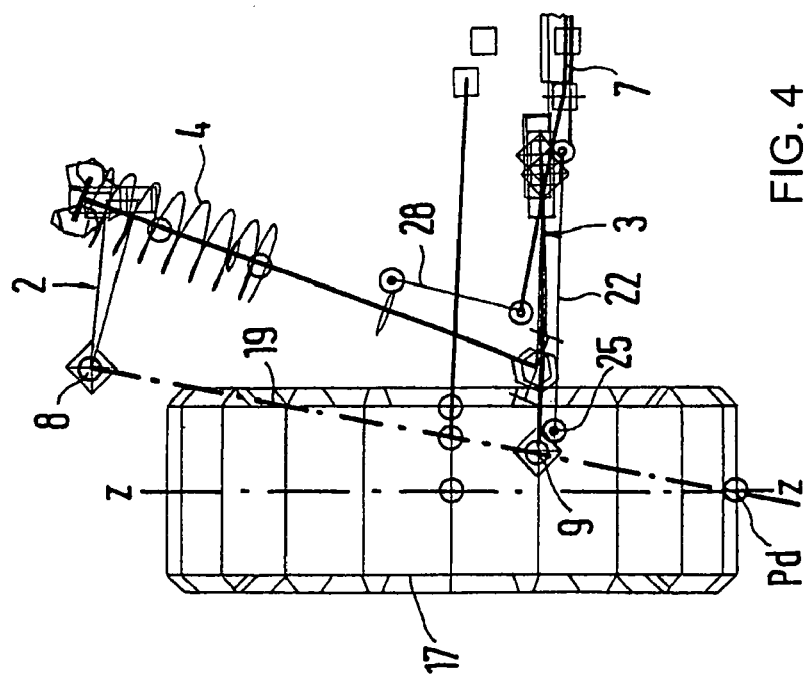
FIG. 4 is an illustration showing the wheel suspension according to FIG. 1 in a schematic illustration.
Figure 3:
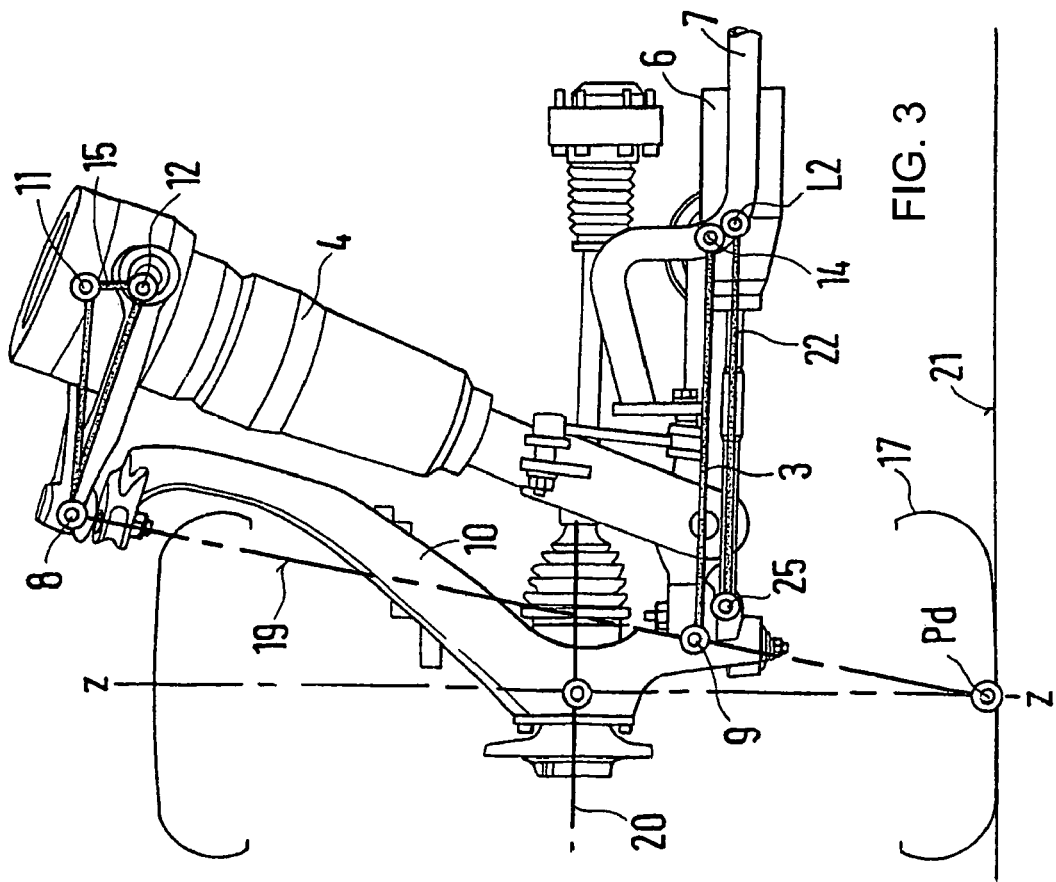
FIG. 3 is a diagrammatic, rear view of the wheel suspension according to FIG. 1.

Referring now to the figures of the drawing in detail and first, particularly, to FIGS. 1-3 thereof, there is shown a front wheel suspension 1 for a motor vehicle substantially contains an upper transverse link 2, a lower transverse link 3, a damper strut 4, a track rod 22 of a steering device 6 and a stabilizer 7. The transverse links 2 and 3 are held in an articulatedly connected fashion on a wheel carrier 10 in each case by a mount 8, 9 and on the vehicle body, or optionally on a subframe of the vehicle body, by in each case two mounts 11, 12 and 13, 14.

The upper transverse link has a position above a horizontal wheel central transverse plane y-y and forms (FIG. 2), with its body-side mounts 11, 12 on two transversely projecting link arms 2a and 2b, a rotational axis 15 which is arranged so as to lie parallel to a vertical wheel central longitudinal plane z-z.

A body-side mount 11 of the upper transverse link 2 is situated—in relation to a direction of travel F—in front of the vertical wheel central transverse plane x-x and the further mount 12 is situated—in relation to the direction of travel F—behind the vertical wheel central transverse plane x-x.

The lower transverse link 3 is arranged below the horizontal wheel central transverse plane y-y and has a rotational axis 16 which runs through the body-side mounts 13, 14. The two mounts 13, 14 are arranged—in relation to the direction of travel F—in front of the vertical wheel central transverse plane x-x. The rotational axis 16 is arranged at an acute angle α with respect to the rotational axis 15 of the upper transverse link 2.

The lower transverse link 3 contains a transverse link arm 3a which is adjoined by a longitudinal link arm 3b which has the front body-side mount 13 which is arranged in front of the outer wheel surface contour (FIG. 1) of the front wheel 17. The rear mount 14 and the wheel-carrier-side mount 9 are arranged—in relation to the direction of travel F—in front of the vertical wheel central transverse plane x-x, with the mounts 14 and 9 being at an equal lateral distance from the vertical wheel central transverse plane x-x. The distance of the mounts 14 and 9 is smaller than the lateral distance from the body-side mount 11 of the upper transverse link to the vertical wheel central transverse plane x-x.

The wheel-carrier-side mount 8 of the upper transverse link 2 is aligned with respect to the wheel-carrier-side mount 9 of the lower transverse link in such a way as to generate a predetermined position of a wheel pivot axis 19 which runs through a wheel axis 20 and which can have a point of intersection Pd with the wheel contact plane 21 in an area region 32 in front of the vertical wheel central transverse plane x-x as seen in a side view and in an area region to both sides of the vertical wheel central longitudinal plane z-z as seen in a rear view (FIG. 2).

Figure 5:
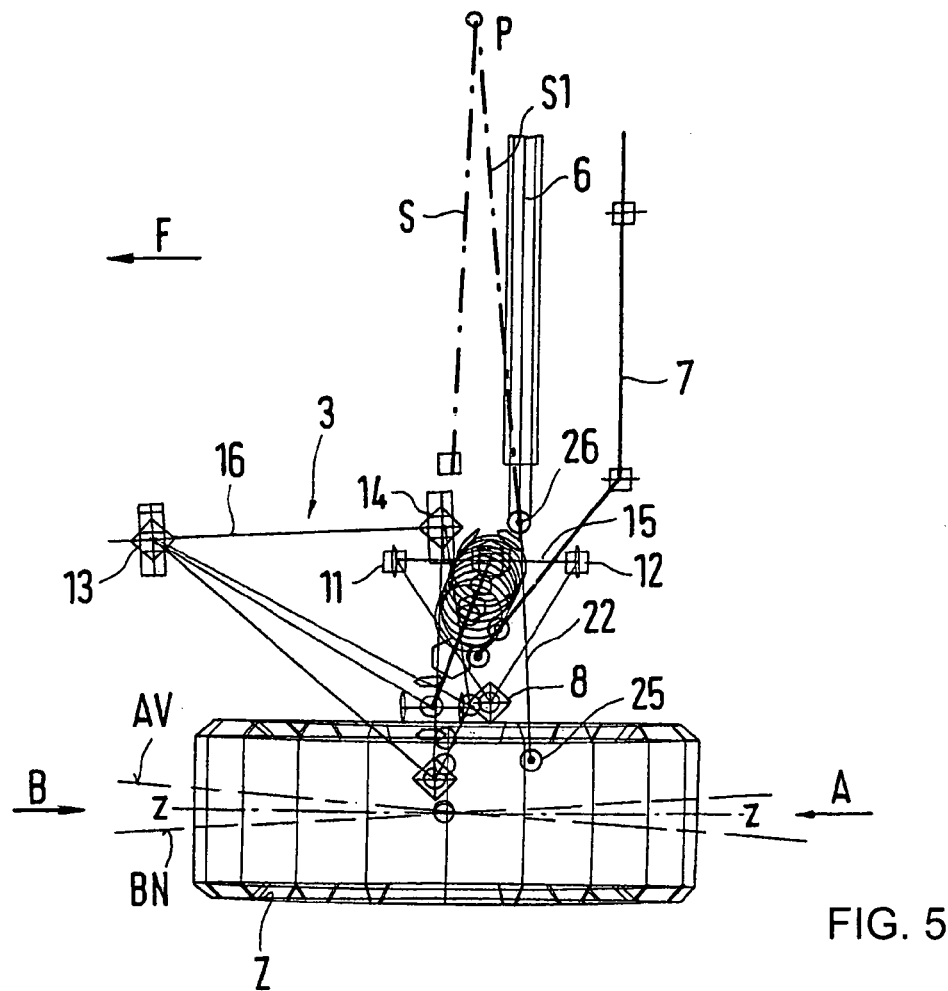
FIG. 5 is a diagrammatic, plan view of a schematic illustration of the wheel suspension according to FIG. 1, having a rotational pole which is formed between the track rod and the lower transverse link and which imparts an action on the wheel under braking forces and drive forces.

As illustrated in more detail in FIG. 5, a rotational pole P is formed within the vertical wheel central longitudinal plane z-z of the wheels, about which rotational pole P the wheel 17 can be adjusted in the direction of toe-out under the influence of braking forces B and in the direction of toe-in under the influence of drive forces A. The rotational pole P is formed by a first ray S which runs through the mounts 9 and 14 of the lower transverse link 3 and which intersects a second ray S1 which runs through a wheel-carrier-side mount 25 of the track rod 22 and through a mount point 26 on the steering device 6. The rotational pole P for the wheel is formed at the point of intersection of the two rays S and S1. In FIG. 5, the initial state of the wheel is denoted by Z and the line BN denotes the toe-out adjustment of the wheel under braking forces B and the line AV denotes the toe-in adjustment under drive forces A.

Figure 6:
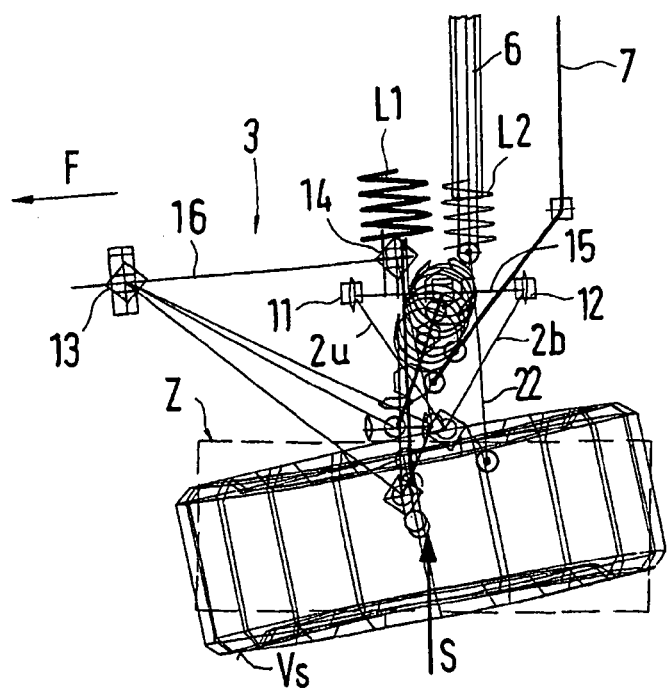
FIG. 6 is a diagrammatic, plan view of the wheel suspension according to FIG. 1, having a rotational pole which is formed between the track rod and the transverse link, and an illustration of different mount characteristics and the action on the wheel in the event of a side force on a wheel at the outside of a corner.

As shown in more detail in FIG. 6, the rear mount 14 of the lower transverse link 3 has a harder mount characteristic L1 than the mount characteristic of the mounting arrangement of the steering track rod 22 or of the steering device 6 with the mount characteristic L2. In this way, it is possible for the wheel which is at the outside of the corner to be adjusted in the direction of toe-out in the event of side forces S. In FIG. 6, the initial state of the wheel is denoted by Z. The adjustment of the wheel is denoted by Vs.

Figure 7:
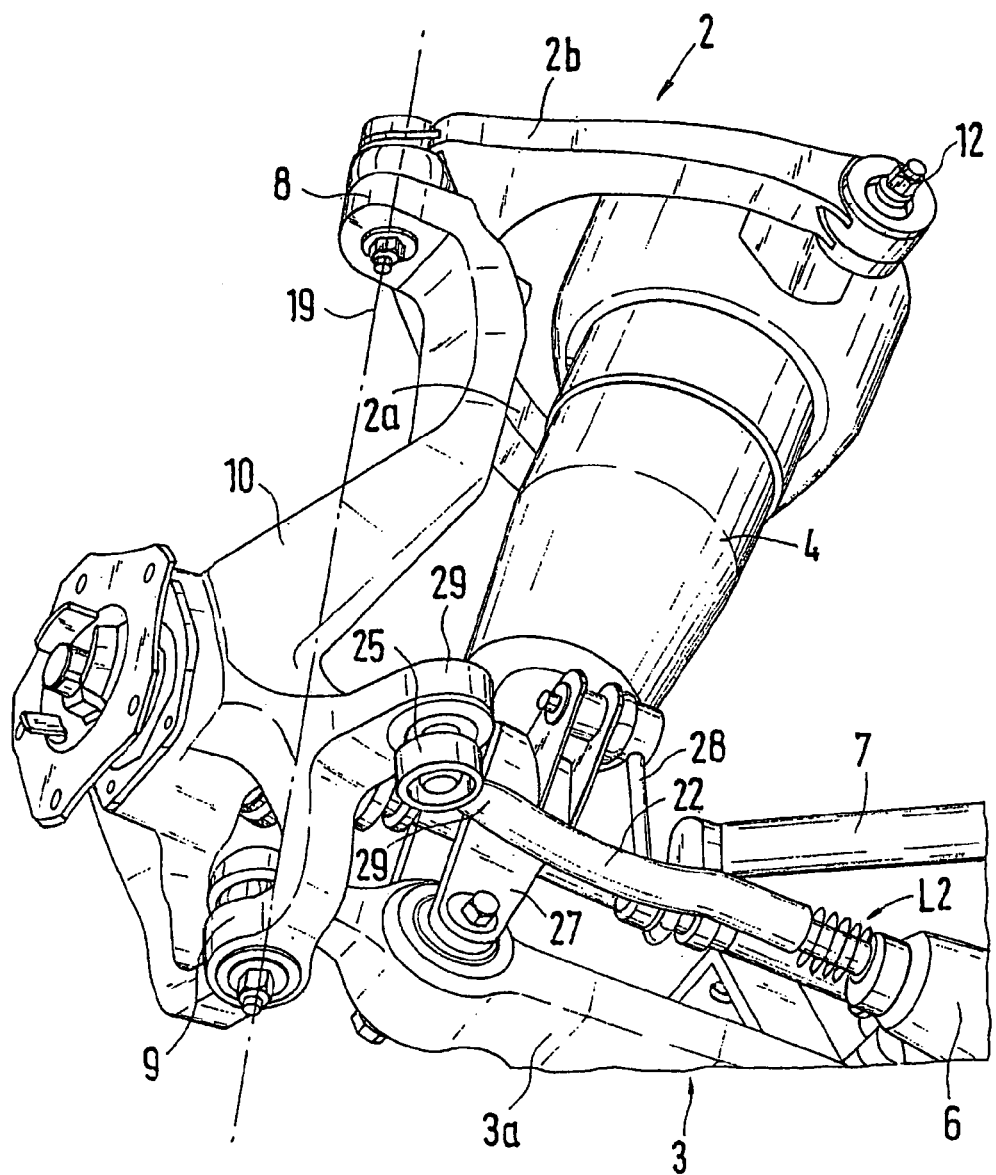
FIG. 7 is a diagrammatic, perspective view of the wheel carrier with the upper and lower transverse link and with an articulatedly connected track rod of the steering device and with the supported damper strut.

The damper strut 4 is supported on the lower transverse link 3 in the transverse link arm 3a by a fork 27 as shown in FIG. 7. A hanger 28 is mounted on the fork 27, which hanger 28 holds the stabilizer 7. A free end 29 of the track rod 22 is held on an arm part 29 of the wheel carrier 10.

The invention claimed is:

1. A wheel suspension for a front axle of a motor vehicle having a wheel and a body, the wheel suspension comprising:
a wheel carrier;
mounts including body-side mounts and wheel-carrier-side mounts;
a first upper transverse link having an upper free end mounted on said wheel carrier, said first upper transverse link having two transversely projecting arms articulatedly connected to the body via said mounts;
a second lower transverse link disposed below a horizontal wheel central plane, said second lower transverse link articulatedly connected at a first side to said wheel carrier in one of said mounts and at a second side to the body in two of said mounts, said second lower transverse link holds a lower end of a damper strut in a supporting fashion, said first upper transverse link and said second lower transverse link have rotational axes and in each case one rotational axis, said rotational axes are defined by means of said body-side mounts and are offset with respect to one another in height, with said rotational axis of said first upper transverse link being disposed closer to the wheel than said rotational axis of said second lower transverse link, and in that in each case one of said body-side mounts for said first upper transverse link is disposed at each side of a vertical wheel central transverse plane, and in that two said body-side mounts for said second lower transverse link are disposed—in relation to a direction of travel—in front of the vertical wheel central transverse plane, and in that a wheel pivot axis is formed by wheel-carrier-side mounts for said first and second transverse links;
said body-side mounts having a front body-side mount for said first upper transverse link and a rear body-side mount for said second lower transverse link disposed, in relation to the direction of travel, in front of the vertical wheel central transverse plane and closer to the vertical wheel central transverse plane than said front body-side mount for said first upper transverse link;
said damper strut having a hanger;
a steering track rod disposed, in relation to the direction of travel, behind the vertical wheel central transverse plane;
a stabilizer situated spaced apart from said steering track rod, said stabilizer mounted by means of said hanger on said damper strut; and
said steering track rod having a free end held on said wheel carrier via one of said mounts and a first ray running through said one mount and through a connection to a steering cylinder unit, the first ray, with a second ray through said wheel-carrier-side mount and through said rear body-side mount of said second lower transverse link in a plan view, forms an instantaneous rotational pole within the vertical wheel central longitudinal plane, and the wheel can be elastokinematically adjusted in a toe-out sense under an influence of braking forces and can be elastokinematically adjusted in a toe-in sense under an influence of drive forces.

2. The wheel suspension according to claim 1, wherein said rotational axis of said first upper transverse link runs parallel to a vertical wheel central longitudinal plane, and in that said rotational axis of said second lower transverse link is disposed at an acute angle with respect to said rotational axis of said first upper transverse link.

3. The wheel suspension according to claim 1, wherein said wheel-carrier-side mount for said first upper transverse link is disposed—in relation to the direction of travel—behind the vertical wheel central transverse plane, and in that said wheel-carrier-side mount of said second lower transverse link is disposed—in relation to the direction of travel—in front of the vertical wheel central transverse plane.

4. The wheel suspension according to claim 3, wherein said wheel-carrier-side mount for said first upper transverse link, which is situated behind the vertical wheel central transverse plane in relation to the direction of travel, has a greater spacing with respect to the vertical wheel central transverse plane than said wheel-carrier-side mount for said second lower transverse link, which is arranged in front of the vertical wheel central plane in relation to the direction of travel.

5. The wheel suspension according to claim 1, wherein said wheel-carrier-side mount of said second lower transverse link is situated on an identical vertical, obliquely-running plane to said mounts of said first upper transverse link.

6. The wheel suspension according to claim 1, wherein the wheel pivot axis of the wheel is formed by said wheel-carrier-side mounts of said first and second transverse links and runs, through a wheel axis, obliquely outward toward the wheel and forward in relation to the direction of travel, and has a point of intersection with a wheel contact plane in an area region of the wheel central longitudinal plane and—in relation to the direction of travel—in front of the vertical wheel central transverse plane.

7. The wheel suspension according to claim 1, wherein said side-body mounts include a rear mount for said second lower transverse link which has a harder mount characteristic than a relatively soft mounting of a steering track rod of a steering cylinder unit with a softer mount characteristic.

8. The wheel suspension according to claim 7, wherein, during cornering, under an action of side forces or loads on the wheel which is at an outside of a corner, said mountings with the different characteristics can be elastokinematically controlled such that the wheel can be adjusted in a direction of toe-out.

* * * * *